United States Patent [19]

Baker

[11] Patent Number: 4,602,176
[45] Date of Patent: Jul. 22, 1986

[54] MEANS FOR AND METHOD OF REDUCING VIBRATION OF NOISE BETWEEN A DYNAMOELECTRIC MACHINE AND ITS APPLICATION

[75] Inventor: Gerald N. Baker, S. Louis County, Mo.

[73] Assignee: Emerson Electric Co., St. Louis, Mo.

[21] Appl. No.: 645,994

[22] Filed: Aug. 30, 1984

[51] Int. Cl.$^4$ ............................................. H02K 5/24
[52] U.S. Cl. ..................................................... 310/51
[58] Field of Search ........................................... 310/51

[56] References Cited

U.S. PATENT DOCUMENTS 2,188,807 1/1940 Castricone .................... 310/51 UX
3,941,339 3/1976 McCarty ......................... 310/51 X
4,425,813 1/1984 Wadenstein ........................ 310/51

*Primary Examiner*—Donovan F. Duggan
*Attorney, Agent, or Firm*—Polster, Polster and Lucchesi

[57] ABSTRACT

Means for reducing mechanical vibration or acoustical noise between a dynamoelectric machine (e.g., an electric motor) and its application is disclosed in which the endshield of the motor has at least one stud extending therefrom. The application (e.g., a washing machine transmission) has an application frame with at least one aperture therein coaxially receiving the stud. An elastomeric grommet having a bore therethrough receives at least a portion of the stud and the grommet bears on the endshield of the motor and on the application frame. A first portion of the stud, which protrudes beyond the endshield, has a cross section substantially equal to the cross section of the grommet bore, and the grommet has another portion thereof between the outer end of the first portion of the stud and the application frame, with this last-said portion of the grommet being clear of the stud so that it is unrestricted by the stud so as to substantially freely permit lateral shear of the elastomeric grommet thereby to effectively damp vibration and/or noise between the application and the motor.

6 Claims, 6 Drawing Figures

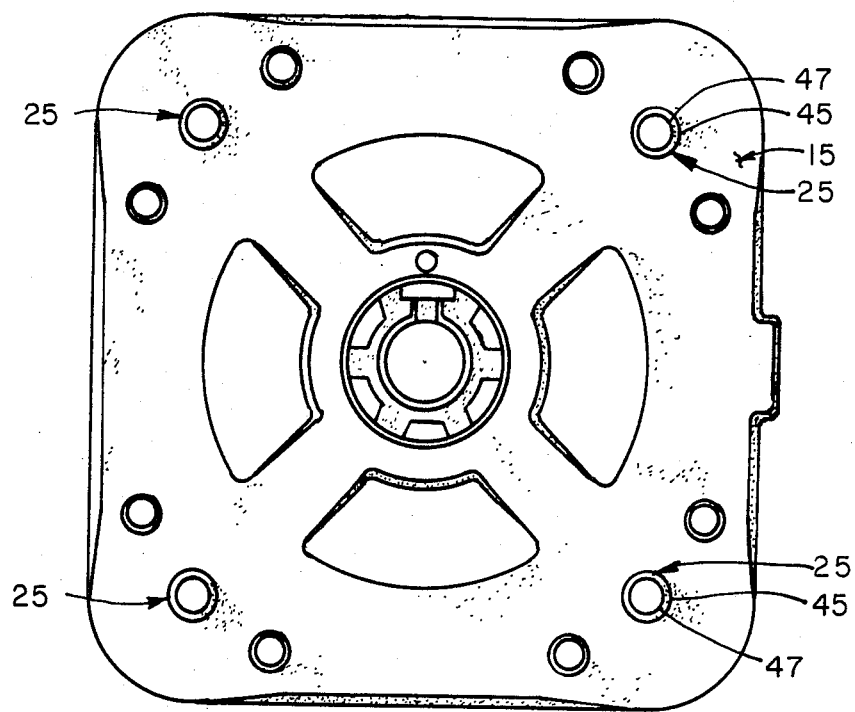
FIG. 3.
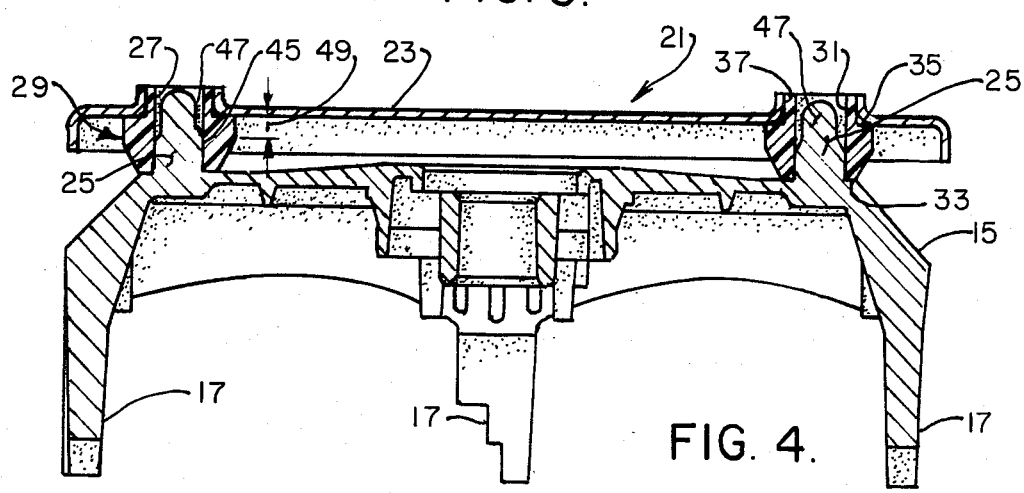
FIG. 4.
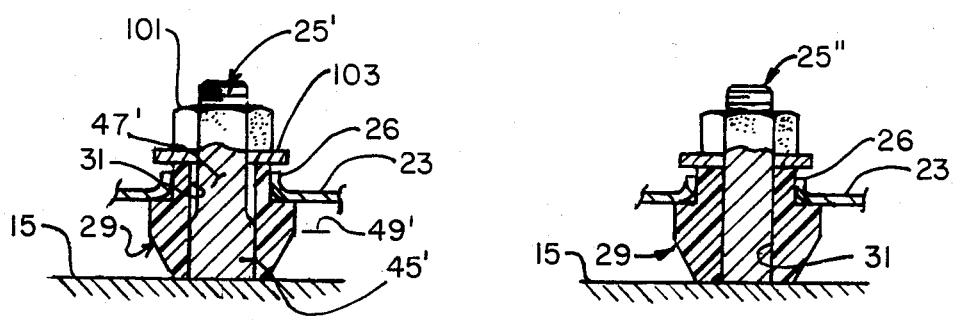
FIG. 5.
FIG. 6.
PRIOR ART.

4,602,176

MEANS FOR AND METHOD OF REDUCING VIBRATION OF NOISE BETWEEN A DYNAMOELECTRIC MACHINE AND ITS APPLICATION

BACKGROUND OF THE INVENTION

This invention relates to means for and to a method of reducing mechanical vibration and acoustical noise between the dynamoelectric machine and its application. More specifically, the particular application shown and described in the instant disclosure relates to mounting an electric motor on the transmission case of a washing machine for effectively damping mechanical vibration and acoustical noise transmitted therebetween.

Generally, in many applications, such as in a washing machine, it is highly desirable to minimize the amount of mechanical vibration and noise emitted by the appliance during operation thereof. In an effort to damp the transmission of mechanical vibration and noise, it has long been conventional practice to interpose an elastomeric grommet or pad between an electric motor and its application. In many instances, the rubber grommet was fitted into an aperture provided in the application frame and a bolt or fastener, approximately the same diameter as a central bore extending through the grommet was utilized to fasten the application to the motor. When a nut was threaded on the stud so as to at least partially compress the grommet, the grommet bore expanded radially inwardly and thus made good contact with the stud extending through the grommet bore. This typical prior art construction is shown in FIG. 6 of the drawing figures. While this prior art system of noise and vibration reduction did, in fact, significantly reduce the transmission of noise and mechanical vibration between the application and the motor, significant noise and vibration levels, as measured by mechanical accelerometers (expressed in milli-G's) and acoustical sound measuring apparatus (expressed in sones) was still appreciable. Moreover, over time, these prior art elastomeric grommets tended to become more stiff, thus transmitting even more mechanical noise and vibration.

Thus, there has been a long-standing need to even more effectively reduce the transmission of acoustical noise and mechanical vibration between a motor (e.g., a dynamoelectric machine) and its application in a simple and cost effective manner which may be readily installed both during manufacture of the appliance and during field service thereof.

SUMMARY OF THE INVENTION

Among the several objects and features of the present invention may be noted the provision of means for significantly reducing vibration and mechanical noise between a dynamoelectric machine and its application;

The provision of such means which is of low cost and which is easy to install, both during manufacture of an appliance and during field service thereof;

The provision of such means which, even though the noise and vibration levels are significantly reduced, still provides accurate and positive securement and orientation of the motor relative to its application; and The provision of such means and method which is reliable in operation, which has a long service life, and yet which accurately maintains proper orientation between the motor and its application.

Other objects and features of this invention will be in part apparent and in part pointed out hereinafter.

Briefly stated, a dynamoelectric machine, such as an electric motor having a stator, the stator is typically secured to its application (e.g., a washing machine transmission or the like). The application is defined to have a frame having at least one aperture therein. The stator includes an endshield. The improvement of this invention relates to the endshield having at least one stud extending therefrom, and the application frame having an aperture substantially coaxial with the stud. An elastomeric grommet is provided having a bore therethrough receiving at least a portion of the stud, this grommet bearing on the endshield and on the application frame. Means is provided for securing the application to the motor and for at least partially compressing the grommet between the application frame and the endshield of the motor. A first portion of the stud protrudes beyond the endshield and has a cross section substantially equal to the cross section of the grommet bore. The grommet further has another portion thereof between the outer end of the first portion of the stud and the application frame, with this other portion of the grommet bore being clear of the stud so that it is substantially unrestricted by the stud so as to substantially freely permit lateral shear movement of the last-said grommet portion thereby to more effectively damp vibration and/or acoustical noise between the application and the motor.

The method of this invention relates to the damping of mechanical vibration and/or acoustical noise between an electric motor and its application. The application includes an application frame, with the latter having at least one aperture therein. The motor has a stud rigidly secured thereto for cooperation with the aperture so as to facilitate mounting of the motor with respect to the application. More specifically, this method includes mounting the motor on the application frame such that the stud is in substantially axial alignment with respect to the aperture. Then, an elastomeric grommet is interposed between the motor and the application frame such that a portion of the grommet spaced axially outwardly beyond the end portion of the stud is in engagement with the application frame, and is free of engagement with the stud so as to permit this portion of the grommet to substantially freely flex in transverse direction relative to the stud. The elastomeric gasket is compressed, at least in part, between the motor and the application frame.

BRIEF DESCRIPTION OF THE DRAWINGS

FIG. 3 is a view taken along line 3—3 of FIG. 1, illustrating the outer end of the endshield of the motor shown in FIG. 1;

FIG. 4 is a cross sectional view, taken along line 4—4 of FIG. 2, illustrating the manner in which the application frame is mounted on the endshield of the motor, utilizing elastomeric grommets so as to damp mechanical vibration and acoustical noise in accordance with this invention;

FIG. 5 is a cross sectional view of a portion of an aperture of the application frame receiving another embodiment of a stud in accordance with this invention so as to reduce transmission of mechanical vibration and acoustical noise between the application and the motor wherein the stud serves the double function of laterally and axially locating and securing the application to the motor; and FIG. 6 is a view similar to FIG. 5 of a prior art mounting stud and grommet.

Corresponding reference characters indicate corresponding parts throughout the several views of the drawings.

DESCRIPTION OF PREFERRED EMBODIMENTS

Figure 1:
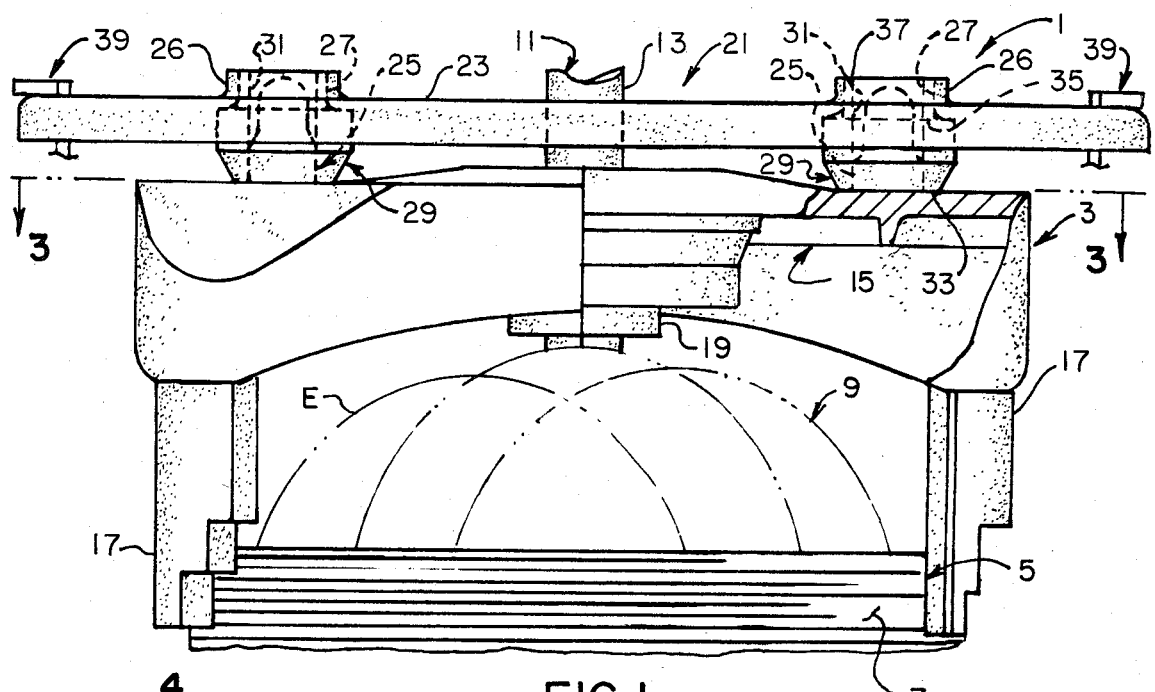
FIG. 1 is a side elevational view of a dynamoelectric machine (e.g., an induction motor), having a stator assembly including an endshield with the endshield mounted to an application (e.g., the transmission of a washing machine) in accordance with this invention so as to reduce mechanical vibration and acoustical noise transmission between the application and the motor.

Referring now to the drawings, a dynamoelectric machine or an induction electric motor is indicated in its entirety by reference character 1. Motor 1 is shown to include a stator assembly 3 having a core 5 madeup of a stack of laminations 7 of suitable ferromagnetic material. As is conventional, core 5 has a central bore (not shown) extending longitudinally therethrough, with a plurality of radial slots (also not shown) extending outwardly from the bore. These slots receive coils of suitable magnet wire or the like which constitute the windings 9 of the motor. The windings extend out beyond the end face of core 5 and are referred to as the end turns E of the windings.

Further, motor 1 includes a rotor assembly 11 including a rotor shaft 13 extending out beyond core 5. The stator assembly 3 further includes an endshield or bearing support member 15 having endshield legs 17 which are fixedly secured to core 5. Endshield 15 includes a bearing 19 for receiving and for journaling rotor shaft 13 thereby to rotatably support rotor assembly 11, centered within the central bore of core 5, and to permit the rotor assembly to rotate freely with respect to the core.

As is typical, motor 1 is secured or otherwise attached to an application generally indicated at 21. For example, application 21 may be the transmission of a washing machine. Typically, application 21 will have an application frame plate 23 which constitutes the portion of the application receiving the motor. Endshield 17 has a plurality of studs 25 secured thereto and extending endwise therefrom to aid in securement of motor 1 to the application. As shown in the drawings, studs 25 are integrally die cast with endshield 15. However, it will be understood that studs 25 may also be constituted by separate members (not shown) which are press fit into apertures (also not shown) formed in endshield 15. Within the broader aspects of this invention, it does not matter, from a functional standpoint, as to whether studs 25 are cast integrally with the endshield or are press fit (or otherwise secured) therein. However, it is to be understood that the integrally die cast studs 25, as shown in the drawings, may be preferred inasmuch as substantial cost savings and labor savings may be realized by utilizing the integrally die cast studs. Application frame plate 23 is shown to have a plurality of circular lips 26 protruding upwardly above the surface of application frame plate 23 so as to each define a frame aperture 27.

In accordance with this invention, an elastomeric grommet, as generally indicated at 29, is interposed between the outer face of endshield 15 and the inner face of application frame plate 23. Each grommet 29 includes a central grommet bore 31 of a constant diameter from one end to the other. Each grommet further includes a base 33 which bears on endshield 15 and a shoulder 35 spaced from base 33 which bears on the underside of application frame 23 generally radially outwardly of circular lip 26 thereby to cushion the application frame 23 on the endshield. Still further, each grommet 29 includes a neck portion 37 which extends upwardly within aperture 27 with the upper or outer end of the neck 37 being generally coplanar with the upper, outer edges of circular lip 26. As is conventional, grommet 29 is molded of a conventional Neoprene blend elastomeric material which, for example, may typically be about 60-70 percent Neoprene, with the remainder being of a styrene butadiene rubber. Durometer reading for grommet may vary widely. For example, grommets 29 have a Shore (A) hardness ranging between about 36-60 effectively reduce both mechanical vibration and acoustical noise. With the broader aspects of this invention, other elastomeric materials and materials having a relatively broad range of Shore hardness may be used.

As generally indicated at 39, means is provided for securing application frame 23 to stator assembly 3, and more particularly, to endshield 15 for positively securing application 21 relative to the motor, and also for compressing grommets 29 between endshield 15 and application frame 23. As shown best in FIGS. 1 and 2, securement means 39 is shown to comprise a pair of straps 41, with each of the straps having a flange 43 adapted to engage a portion of the application frame. The strap 41, together with its flange 43, is inserted through a respective strap aperture 44 (see FIG. 2), provided in application frame 23, and then rotated 90 degrees relative to the application frame to the position shown in FIG. 2. The lower end of strap 41 (not shown) to resiliently engages a portion of the motor (e.g., the opposite face of core 5) such that when the strap is inserted and resiliently pushed inwardly toward the core, the strap will snap into place between the application frame and the core, thus positively, resiliently, securing the application 21 relative to the motor, and at least in part compressing grommets 29. In this manner, the axial position of the application is fixed relative to the motor.

Figure 2:
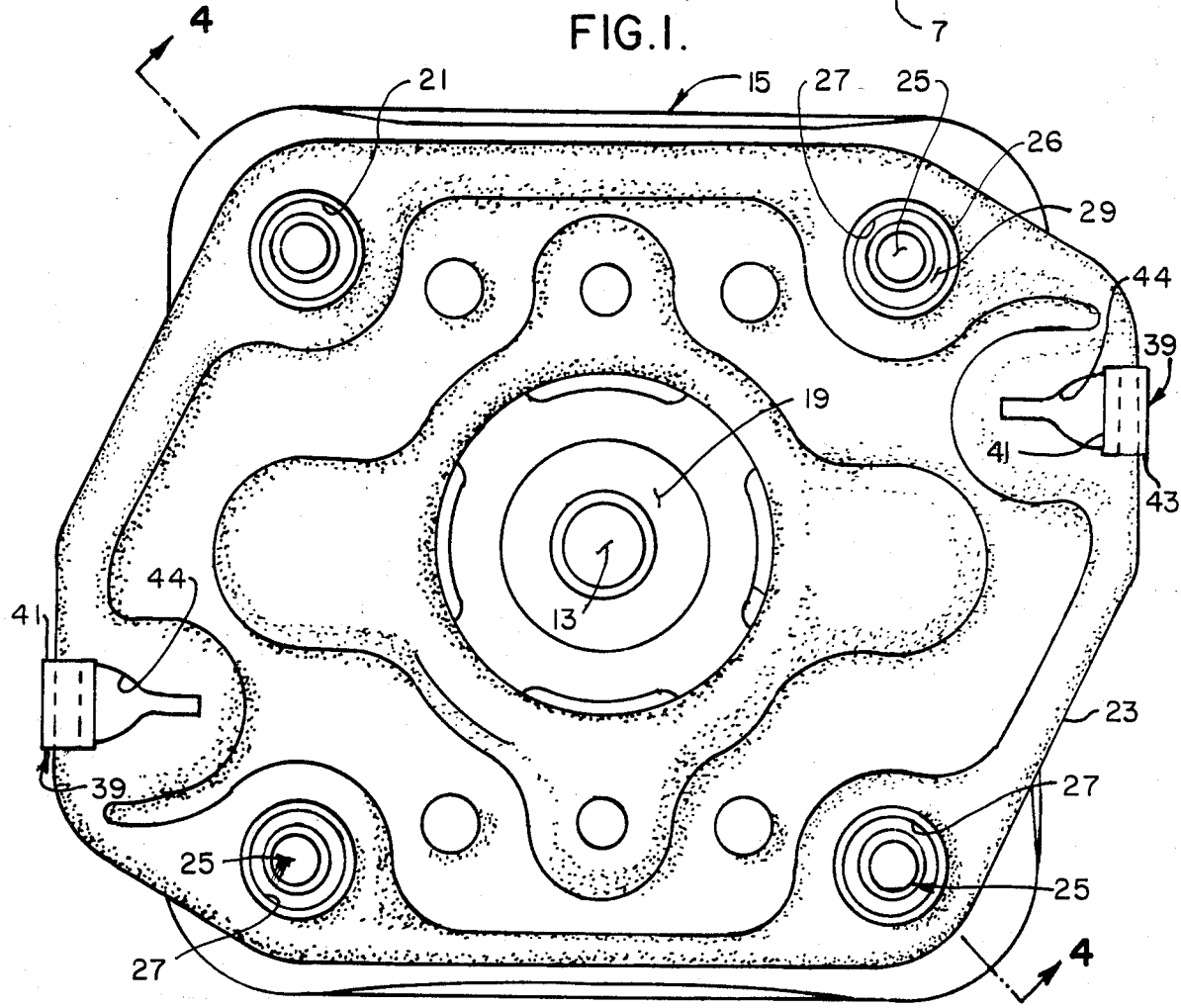
FIG. 2 is a top plan view of FIG. 1.

As best shown in FIGS. 1 and 4, stud 25 has a base portion 45 having a diameter or cross section substantially equal to the center bore 31 of grommet 29. Stud portion 45 extends outwardly from the end face of endshield 15 a substantial distance, but in accordance with this invention, the stud terminates short of the inner face of application plate 23. Further, stud 25 has an optional outer end portion 47 of a smaller diameter cross section than base portion 45, with the smaller stud portion 47 extending inwardly to grommet bore 31 out beyond the base portion of the stud 45. The portion of grommet 29 between the transition between the large and small diameter portions 45 and 47, respectively, of stud 25, and shoulder 35 of grommet 37 is indicated by reference character 49.

In accordance with this invention, grommet portion 49 is clear of stud 25, and more particularly, clear of the smaller diameter stud portion 47, when the grommet is at least partially compressed such that the grommet portion 49 is substantially free to elastically flex in transverse direction relative to the studwithout interference from stud 25. Thus, the grommet is able to damp both acoustical noise and mechanical vibration in a surprising and unexpected fashion, as compared to conventional prior art studs and grommets, as generally shown in FIG. 6, in which the grommet bore is substantially the same diameter as the stud along the entire length of the grommet bore. In such instances, significantly higher instances of mechanical vibration and acoustical noise are transmitted between the application and the motor.

By way of example, it has long been a desired object in the production of automatic washing machines to maintain the acoustical sound level of the washing machine, when in normal operation, below a sound level of 100 Sones. However, the sound levels emitted by some washing machines tended to be at or significantly above the 100 Sone level. In an effort to compare the noise levels of washing machines which, when motor 1 was mounted to the washing machine transmission (i.e., application 21) by conventional prior art elastomeric grommets, similar to those illustrated in FIG. 6, such that the washing machines tested emitted an acoustical noise level in excess of 100 Sones. These same washing machines were then fitted with studs 25 of the present invention, and then the noise levels of the machines were again measured. In all instances, the excessively noisy machines had their noise levels reduced to below 100 Sones, and, on the average, the noise level of all 20 washing machines were reduced an average of about 24.7 percent, thus bringing all the washing machines below the desired maximum noise level of 100 Sones. The 20 washing machines were purchased from commercial sources, were designed for two-speed automatic operation, and were rated for 14-pound loading. The noise levels of each of the washing machines, arbitrarily assigned machine numbers 1–20, when the washing machine was equipped with a motor mounted in accordance with prior art techniques, generally as shown in FIG. 6, and the identical motors mounted in accordance with the present invention, generally as shown in FIG. 4, are presented in Table I below.

TABLE I

MOTOR NOISE COMPARISON

| Washing Machine No. | Prior Art Mounting (Sones) | Present Invention Mounting (Sones) |
| --- | --- | --- |
| 1 | 123 | 92 |
| 2 | 106 | 84 |
| 3 | 126 | 88 |
| 4 | 104 | 86 |
| 5 | 104 | 84 |
| 6 | 115 | 85 |
| 7 | 104 | 78 |
| 8 | 116 | 83 |
| 9 | 120 | 92 |
| 10 | 119 | 91 |
| 11 | 117 | 99 |
| 12 | 129 | 84 |
| 13 | 122 | 91 |
| 14 | 126 | 86 |
| 15 | 122 | 97 |
| 16 | 117 | 84 |
| 17 | 107 | 85 |
| 18 | 95 | 77 |
| 19 | 100 | 81 |
| 20 | 126 | 84 |

In another test, a similar washing machine was operated at high and low speeds both during its agitation and spinning cycles. The mechanical vibration between the washing machine motor and its application (i.e., the washing machine transmission) were measured by means of accelerometers affixed thereto, with the mechanical vibration being measured in a torsional mode. The mechanical torsional vibration, measured in milli-G's was recorded, as shown in Table II below.

TABLE II

MECHANICAL VIBRATION COMPARISON TORSION

| Mounting Type | Agitation Cycle | | Spin Cycle | |
| --- | --- | --- | --- | --- |
| | Hi Speed (G's × $10^{-3}$) | Low Speed (G's × $10^{-3}$) | Hi Speed (G's × $10^{-3}$) | Low Speed (G's × $10^{-3}$) |
| Prior Mounting | 1592 | 1607 | 1368 | 1660 |
| Present Invention | 1008 | 1155 | 934 | 1156 |

It can be seen that there was an appreciable reduction in torsional vibration level in each mode of operation of the washing machine.

As a result of the testing shown in Tables I and II, considerable reductions in acoustical noise and mechanical vibration were experienced utilizing the mounting system of the present invention.

In FIG. 6, it will be noted that a prior art stud 25″ has a substantially constant diameter and uniformly contacts the grommet along the entire length of the stud between motor endshield 15 and application frame 23.

In view of the above, it will be seen that the other objects of this invention are achieved and other advantageous results obtained.

As various changes could be made in the above constructions or method without departing from the scope of the invention, it is intended that all matter contained in the above description or shown in the accompanying drawing shall be interpreted as illustrative and not in a limiting sense.

What is claimed is:

1. In a dynamoelectric machine having a stator, said stator being secured to an application, said application having at least one aperture therein, said stator including an endshield, wherein the improvement comprises: said endshield having a stud extending threfrom, said application aperture being substantially coaxial with respect to said stud, an elastomeric grommet having a bore therethrough receiving at least a portion of said stud, said grommet bearing on said endshield and on said application, means for securing said application to said dynamoelectric machine and for at least partially compressing said grommet between said application and said endshield into an operating position, a first portion of said stud protruding beyond said endshield and having a cross section substantially equal to the cross section of a portion of said grommet bore, said grommet having a portion thereof between the outer end of said first portion of said stud and said application such that with said grommet being in its compressed, operating position, said grommet portion being clear of said stud in the region of this last-mentioned portion of said grommet so that this last-mentioned grommet portion is substantially unrestricted by said stud thereby to permit lateral shearing of said grommet portion substantially without impediment by said stud thereby to facilitate damping of mechanical vibration and/or acoustical noise between said application and said dynamoelectric machine.

2. In a dynanoelectric machine as set forth in claim 1 wherein said windshield is integrally cast of a suitable material, and wherein said stud is integral with said endshield.

3. In a dynamoelectric machine as set forth in claim 1 wherein said endshield has an opening therein, and wherein said stud is secured within said opening.

4. In a dynamoelectric machine as set forth in claim 1 wherein said stud has a second portion of lesser cross section than said first portion of said stud, said second stud portion extending axially out beyond said first stud portion within said grommet bore thereby to aid in retaining said grommet on said stud upon said application and said motor experiencing relatively high shock or impact loads or the like.

5. In a dynamoelectric machine as set forth in claim 1 wherein said stud has a second portion of lesser cross section than said diameter bore with said second portion extending axially through said grommet bore, and wherein said means for securing said application to said dynamoelectric machine is applied to said second portion of said stud extending out beyond said grommet.

6. A method of damping mechanical vibration and/or acoustical noise between an electric motor and its application, said application having at least one aperture therein, said motor having a stud rigidly secured thereto for cooperation with said aperture so as to facilitate mounting of said application with respect to said motor, wherein the method of the present invention comprises the steps of:

mounting said motor on said application such that said stud is in substantial axial alignment with said aperture;

interposing an elastomeric grommet between said motor and said application such that a portion of said grommet spaced axially outwardly beyond said portion of said stud in engagement with said grommet is free of said stud so as to substantially freely permit said portion of said grommet to flex in transverse direction relative to said stud; and at least in part compressing said grommet between said motor and said application frame with said portion of said grommet remaining free of said stud after compression of said grommet.

* * * * *